United States Patent
Bohling et al.

(10) Patent No.: US 9,303,161 B2
(45) Date of Patent: Apr. 5, 2016

(54) DISPERSION OF ADSORBING EMULSION POLYMER PARTICLES

(71) Applicant: Rohm and Haas Company, Philadelphia, PA (US)

(72) Inventors: James C. Bohling, Lansdale, PA (US); Arnold S. Brownell, Lansdale, PA (US); Yogesh Tiwary, Hatfield, PA (US)

(73) Assignee: Rohm and Haas Company, Philadelphia, PA (US)

( * ) Notice: Subject to any disclaimer, the term of this patent is extended or adjusted under 35 U.S.C. 154(b) by 0 days.

(21) Appl. No.: 14/375,186

(22) PCT Filed: Jan. 30, 2013

(86) PCT No.: PCT/US2013/023817
§ 371 (c)(1),
(2) Date: Jul. 29, 2014

(87) PCT Pub. No.: WO2013/116318
PCT Pub. Date: Aug. 8, 2013

(65) Prior Publication Data
US 2015/0005446 A1    Jan. 1, 2015

Related U.S. Application Data

(60) Provisional application No. 61/592,647, filed on Jan. 31, 2012.

(51) Int. Cl.
| | |
|---|---|
| *C08F 230/02* | (2006.01) |
| *C08L 33/08* | (2006.01) |
| *C08F 2/00* | (2006.01) |
| *C08F 2/24* | (2006.01) |
| *C08F 265/04* | (2006.01) |
| *C08L 51/00* | (2006.01) |

(52) U.S. Cl.
CPC ............. *C08L 33/08* (2013.01); *C08F 2/001* (2013.01); *C08F 2/24* (2013.01); *C08F 265/04* (2013.01); *C08L 51/003* (2013.01)

(58) Field of Classification Search
CPC .... C08F 230/02; C08F 220/18; C08F 228/02; C09D 143/02; C08K 2003/2241
USPC .......................................................... 524/458
See application file for complete search history.

(56) References Cited

U.S. PATENT DOCUMENTS

| | | | | |
|---|---|---|---|---|
| 5,385,960 | A | * | 1/1995 | Emmons et al. ............... 523/205 |
| 6,080,802 | A | * | 6/2000 | Emmons et al. ............... 523/205 |
| 6,576,051 | B2 | * | 6/2003 | Bardman et al. ............... 106/436 |
| 7,179,531 | B2 | | 2/2007 | Brown et al. |
| 7,285,590 | B2 | * | 10/2007 | Holub et al. ................... 524/460 |
| 2004/0054063 | A1 | * | 3/2004 | Brown et al. .................. 524/500 |
| 2008/0146724 | A1 | * | 6/2008 | Bohling et al. ................ 524/500 |
| 2012/0058277 | A1 | * | 3/2012 | Bohling et al. ............. 427/385.5 |
| 2014/0163160 | A1 | * | 6/2014 | Bohling et al. ................ 524/547 |
| 2014/0221560 | A1 | * | 8/2014 | Bohling et al. ................ 524/533 |
| 2014/0329957 | A1 | * | 11/2014 | Bohling et al. ................ 524/547 |
| 2015/0005446 | A1 | * | 1/2015 | Bohling et al. ................ 524/807 |
| 2015/0011695 | A1 | * | 1/2015 | Bohling et al. ................ 524/521 |
| 2015/0025172 | A1 | * | 1/2015 | Bohling et al. ................ 523/122 |

* cited by examiner

*Primary Examiner* — Michael A Salvitti
(74) *Attorney, Agent, or Firm* — Reid S. Willis

(57) ABSTRACT

The present invention relates to a process comprising contacting a stable aqueous dispersion of pre-formed polymer particles with a monomer emulsion under emulsion polymerization conditions to form a stable aqueous dispersion of pre-formed particles protuberating from polymer particles arising from the polymerization of the monomer emulsion; these multistage polymer particles show exceptional compatibility with pigment particles. In another aspect, the present invention is a composition relating to the pre-formed particles.

5 Claims, No Drawings

US 9,303,161 B2

DISPERSION OF ADSORBING EMULSION POLYMER PARTICLES

BACKGROUND OF THE INVENTION

The present invention relates to a stable aqueous dispersion of polymer particles containing adsorbing functional groups and a process for preparing them.

Titanium dioxide ($TiO_2$) is an expensive component in many coatings or paint formulations. The efficacy of $TiO_2$ as a hiding pigment is reduced when $TiO_2$ particles are allowed to come too close together upon film formation and drying (which they tend to do). It has been disclosed that the spacing of $TiO_2$ and its resultant efficiency can be improved using an adsorbing emulsion polymer.

U.S. Pat. No. 7,179,531 (Brown et al.) discloses a dispersion of multistage polymer particles characterized by a relatively small core portion protuberating from a relatively large shell portion of each particle, with the core portion being preferentially functionalized with $TiO_2$-adsorbing groups. These so-called "acorn" particles are disclosed as being useful for preparing $TiO_2$-polymer composite particles that provide dried coatings with improved hiding. The preferred partitioning of adsorbing functional groups at the core portion of the acorn particles is designed to reduce bridging effects; nevertheless, "bleeding" of adsorbing groups to the shell portion of the acorn sometimes occurs, resulting in increased flocculation and concomitant grit formation. Accordingly, it would be desirable to reduce grit formation by generating acorn particles with a more effective partitioning of pigment-adsorbing functional groups at the protuberating core portion of the particles.

SUMMARY OF THE INVENTION

The present invention addresses a problem in the art by providing, in one aspect, a process comprising contacting a stable aqueous dispersion of pre-formed polymer particles with a monomer emulsion under emulsion polymerization conditions to form a stable aqueous dispersion of pre-formed polymer particles protuberating from polymer particles arising from the polymerization of the monomer emulsion, wherein the pre-formed polymer particles comprise, based on the weight of the pre-formed polymer particles: a) 2 to 10 weight percent structural units of a phosphorus acid monomer or a salt thereof; b) from 0.2 to 20 weight percent structural units of a carboxylic acid monomer or a sulfur acid monomer or a salt thereof or a combination thereof; c) from 0.1 to 30 weight percent structural units of a multiethylenically unsaturated monomer; and d) a sufficient proportion of structural units of one or more polymerizable ethylenically unsaturated bulk monomers so that the pre-formed polymer particles have a $T_g$ in the range of from −50° C. to 75° C.; and wherein the monomer emulsion comprises: a) less than 10 percent by weight of a phosphorus acid monomer and salts thereof, based on the weight percent of the structural units of the phosphorus acid monomer or salt thereof in the pre-formed polymer particles; b) from 0.1 to 4 weight percent of a carboxylic acid monomer or sulfur acid monomer or a salt thereof or combination thereof, based on total monomers in the monomer emulsion; c) less than 0.5 weight percent of a multiethylenically unsaturated monomer, based on total monomers in the monomer emulsion; and d) a sufficient proportion of one or more ethylenically unsaturated bulk monomers so that the polymer particles arising from the polymerization of the monomer emulsion have a $T_g$ in the range of from −20° C. to 75° C.; and wherein the weight-to-weight ratio of the monomers in the monomer emulsion to the pre-formed polymer particles is in the range of from 3:1 to 15:1.

In a second aspect, the present invention is a composition comprising a stable aqueous dispersion of pre-formed polymer particles having a) 2 to 10 weight percent structural units of a phosphorus acid monomer or a salt thereof based on the weight of the pre-formed polymer particles; b) from 0.2 to 20 weight percent structural units of a carboxylic acid monomer or a sulfur acid monomer or a salt thereof or a combination thereof based on the weight of the pre-formed polymer particles; c) from 0.1 to 30 weight percent structural units of a multiethylenically unsaturated monomer based on the weight of the pre-formed polymer particles; and d) a sufficient proportion of structural units of one or more polymerizable ethylenically unsaturated bulk monomers so that the pre-formed polymer particles have a $T_g$ in the range of from −50° C. to 75° C.; wherein the polymer particles have a volume average particle size of from 40 to 100 nm; and wherein the percent solids of the pre-formed polymer particles in the stable aqueous dispersion is from 30 to 50%.

DETAILED DESCRIPTION OF THE INVENTION

In a first aspect, the present invention is a process comprising contacting a stable aqueous dispersion of pre-formed polymer particles with a monomer emulsion under emulsion polymerization conditions to form a stable aqueous dispersion of pre-formed polymer particles protuberating from polymer particles arising from the polymerization of the monomer emulsion, wherein the pre-formed polymer particles comprise, based on the weight of the pre-formed polymer particles: a) 2 to 10 weight percent structural units of a phosphorus acid monomer or a salt thereof; b) from 0.2 to 20 weight percent structural units of a carboxylic acid monomer or a sulfur acid monomer or a salt thereof or a combination thereof; c) from 0.1 to 30 weight percent structural units of a multiethylenically unsaturated monomer; and d) a sufficient proportion of structural units of one or more polymerizable ethylenically unsaturated bulk monomers so that the pre-formed polymer particles have a $T_g$ in the range of from −50° C. to 75° C.; and wherein the monomer emulsion comprises: a) less than 10 percent by weight of a phosphorus acid monomer and salts thereof, based on the weight percent of the structural units of the phosphorus acid monomer or salt thereof in the pre-formed polymer particles; b) from 0.1 to 4 weight percent of a carboxylic acid monomer or sulfur acid monomer or a salt thereof or combination thereof, based on total monomers in the monomer emulsion; c) less than 0.5 weight percent of a multiethylenically unsaturated monomer, based on total monomers in the monomer emulsion; and d) a sufficient proportion of one or more ethylenically unsaturated bulk monomers so that the polymer particles arising from the polymerization of the monomer emulsion have a $T_g$ in the range of from −20° C. to 75° C.; and wherein the weight-to-weight ratio of the monomers in the monomer emulsion to the pre-formed polymer particles is in the range of from 3:1 to 15:1.

As used herein, the term "structural unit" of the named monomer, refers to the remnant of the monomer after polymerization. For example, a structural unit of methyl methacrylate is as illustrated:

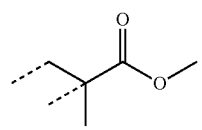

structural unit of methyl methacrylate
where the dotted lines represent the points of attachment of the structural unit to the polymer backbone.

The stable aqueous dispersion of pre-formed polymer particles used in the process of the present invention is advantageously prepared by contacting, under emulsion polymerization conditions, from 2 to 10 weight percent of a phosphorus acid monomer or a salt thereof; b) from 0.5 to 20 of a carboxylic acid monomer or a sulfur acid monomer or a salt thereof or a combination thereof; from 0.1 to 30 weight percent of a multiethylenically unsaturated monomer; and one or more polymerizable ethylenically unsaturated bulk monomers at a level to produce a pre-formed polymer having a $T_g$ of from −50° C. to 75° C. As used herein, the term "ethylenically unsaturated bulk monomers" refer to monomers, other than acid monomers and multethylenically unsaturated monomers, that are used to adjust the $T_g$ of the polymer particles. Examples of suitable polymerizable ethylenically unsaturated bulk monomers include acrylates, such as ethyl acrylate, butyl acrylate, 2-propylheptyl acrylate, and 2-ethylhexyl acrylate; methacrylates, such as methyl methacrylate, ethyl methacrylate; and styrene.

Preferred combinations of bulk monomers used to make the pre-formed polymer include i) methyl methacrylate, ethyl methacrylate, or styrene or a combination thereof, with methyl methacrylate or styrene being preferred; and ii) ethyl acrylate, butyl acrylate, or 2-ethylhexyl acrylate or a combination thereof.

Preferably, the concentration of structural units of ethylenically unsaturated bulk monomer in the pre-formed polymer particles is from 50, more preferably from 70, to 97 weight percent, based on the weight of the pre-formed polymer particles. The pre-formed polymer preferably contains structural units of methyl methacrylate or styrene at a concentration of from 5 weight percent, more preferably from 20 weight percent, to 60 weight percent, more preferably to 40 weight percent, based on the weight of the pre-formed polymer; and preferably contains structural units of butyl acrylate at a concentration of from 35 weight percent, more preferably from 50 weight percent, to 90 weight percent, more preferably to 70 weight percent, based on the weight of the pre-formed polymer.

Examples of suitable phosphorus acid monomers include phosphonates and dihydrogen phosphate esters of an alcohol in which the alcohol contains or is substituted with a polymerizable vinyl or olefinic group. Preferred dihydrogen phosphate esters are phosphates of hydroxyalkyl(meth)acrylates, including phosphoethyl methacrylate and phosphopropyl methacrylates, with phosphoethyl methacrylate being especially preferred. "Phosphoethyl methacrylate" (PEM) is used herein to refer to the following structure:

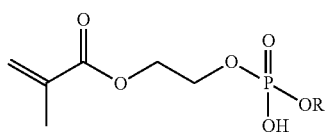

where R is H or

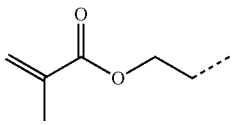

A preferred concentration of structural units of PEM in the pre-formed polymer is from 3 to 8 weight percent, based on the weight of the pre-formed polymer.

Suitable carboxylic acid monomers include acrylic acid, methacrylic acid, itaconic acid, and salts thereof; suitable sulfur acids include sulfoethyl methacrylate, sulfopropyl methacrylate, styrene sulfonic acid, vinyl sulfonic acid, and 2-(meth)acrylamido-2-methyl propanesulfonic acid, and salts thereof. Preferably, a carboxylic acid monomer is used to prepare the pre-formed polymer, more preferably acrylic acid or methacrylic acid. A preferred concentration of structural units of acrylic or methacrylic acid is from 0.5 to 5 weight percent, based on the weight of the pre-formed polymer.

The multiethylenically unsaturated monomer preferably contains two ethylenically unsaturated groups. An especially preferred multiethylenically unsaturated monomer is allyl methacrylate. A preferred concentration of structural units of allyl methacrylate in the pre-formed polymer is from 0.2 to 10 weight percent, based on the weight of the pre-formed polymer.

The pre-formed polymer particles preferably have a volume average diameter in the range of from 50 to 90 nm and preferably have a $T_g$ in the range of from −30° C., more preferably from −20° C., to 40° C., more preferably to 20° C. It is also critical that the pre-formed polymer particles solids content be in the range of from 30 weight percent, more preferably from 40 weight percent, to 50, more preferably 45 weight percent based on the weight of the stable aqueous dispersion of the preformed polymer particles. Though not bound by theory, it is believed that this relatively high solids content significantly increases the likelihood of incorporating phosphorus acid monomer, preferably phosphoethyl methacrylate or phosphoethyl methacrylate oligomers, to the surface of the pre-formed polymer particles; consequently, the presence of the phosphorus acid monomer into the aqueous phase and to the shell is significantly diminished, leading to the desired imbalance of adsorbing phosphorus acid groups in favor of the core of the acorn particle.

The relatively high solids content of the pre-formed polymer dispersion has the added benefit of facilitating the second stage polymerization reaction by enabling less volume of water in the reactor, thereby promoting process flexibility and, ultimately, higher solids in the final product.

The stable aqueous dispersion of pre-formed polymer particles is contacted with a monomer emulsion as described above, under emulsion polymerization conditions to form a stable aqueous dispersion of pre-formed particles protuberating from polymer particles arising from the polymerization of the monomer emulsion. Though not bound by theory, it is believed that the acorn morphology results from the relative incompatibility of the shell and the core, which is presumably, in part, a result of the relative mismatch of charge—the core is more highly charged than the shell and therefore more hydrophilic—and the requirement that the core be crosslinked and the shell be relatively free of crosslinking.

The monomer emulsion preferably comprises methyl methacrylate or styrene or a combination thereof; ethyl acrylate, butyl acrylate, or ethylhexyl acrylate, or a combination thereof; and acrylic acid or sodium styrene sulfonate or salts thereof or a combination thereof.

The preferred weight percent of monomers in the monomer emulsion to the pre-formed polymer is from 8:1 to 12:1. The monomers in the monomer emulsion contain less than 10 percent by weight percent of the phosphorus acid monomer in the pre-formed polymer, which corresponds approximately to less than 1 percent by weight of the phosphorus acid monomer, based on the weight of the monomer emulsion, assuming the weight to weight ratio of monomers in the monomer emulsion to the pre-formed polymer is 10:1. For example if the pre-formed polymer contains 5 weight percent phosphorus acid monomer, based on the weight of the pre-formed polymer, the weight percent of the phosphorus acid monomer in the monomer emulsion would be limited to less than 0.5 weight percent based on the weight of the monomer emulsion.

Preferably, less than 1 percent by weight percent of the phosphorus acid monomer in the pre-formed polymer is found in the monomer emulsion (less than 0.1 percent by weight, based on the weight of the monomer emulsion), more preferably less than 0.1 percent by weight (less than 0.01 percent by weight, based on the weight of the monomer emulsion); most preferably, no phosphorus acid monomer is found in the monomer emulsion.

The concentration of the ethylenically unsaturated bulk monomer in the monomer emulsion is preferably from 80 to 99 weight percent, based on the weight of the monomers in the monomer emulsion. A preferred combination of monomers in the monomer emulsion include methyl methacrylate or styrene or a combination thereof, and butyl acrylate, wherein the methyl methacrylate or styrene or a combination thereof is preferably present at a concentration in the range of from 25 weight percent, more preferably from 32 weight percent, to 75 weight percent, more preferably to 45 weight percent, based on the weight of monomers in the monomer emulsion; and butyl acrylate is preferably present at a concentration in the range of from 40 weight percent, more preferably from 45 weight percent to preferably 70 weight percent, more preferably to 65 weight percent, based on the weight of monomers in the monomer emulsion; another preferred combination of monomer in the monomer emulsion is methyl methacrylate or styrene or a combination thereof, and ethylhexyl acrylate at a concentration in the range of from 30, more preferably from 35, to 65 more preferably to 60 weight percent; acrylic acid or methacrylic acid or sodium styrene sulfonate or a combination thereof at a total concentration in the range of 1 to 4 weight percent, all based on the weight of monomers in the monomer emulsion; and no phosphorus acid monomers.

The emulsion polymerization reactions used to form the pre-formed polymer and the 2-stage polymer advantageously include suitable surfactants, preferably one or more anionic surfactants such as alkali metal alkyl ether sulfates or benzene sulfonates; examples of such surfactants include sodium laureth-4-sulfate (commercially available as Disponil FES 32 surfactant), sodium laureth-12-sulfate (commercially available as Disponil FES 993 surfactant) or sodium dodecylbenzene sulfonate.

The 2-stage polymer may optionally include structural units of other monomers such as ureido methacrylate, acetoacetoxy ethyl methacrylate, vinyl toluene, diacetone acrylamide, vinyltriethoxysilane, and vinyltrimethoxysilane. The 2-stage polymer may also include a chain transfer reagent such as thiols.

The 2-stage polymeric dispersion is advantageously mixed with pigment, preferably $TiO_2$, to form a composite. It has been surprisingly discovered that the acorn polymeric dispersions prepared using the process of the present invention show a marked improvement in compatibility with a wide variety of pigments, especially $TiO_2$ pigments such as the commercially available Kronos 4311 $TiO_2$ slurry. The combination of polymeric dispersion and pigment is useful in the preparation of paint formulations, which may include a variety of components such as solvents; fillers; rheology modifiers; hollow pigments, including pigments having one or more voids; dispersants, such as aminoalcohols and polycarboxylates; surfactants; defoamers; preservatives, such as biocides, mildewcides, fungicides, algaecides, and combinations thereof; flow agents; leveling agents; and neutralizing agents, such as hydroxides, amines, ammonia, and carbonates.

EXAMPLES

The following examples are for illustrative purposes only and are not meant to limit the scope of the invention.

Comparative Example 1

Preparation of Styrene-Acrylic Acorns by Thermal Seeded Polymerization

A. Stage I

A first monomer emulsion was prepared by mixing deionized water (DI water, 55 g), Disponil FES 32 anionic surfactant (16 g, 30% active), butyl acrylate (92.8 g), methyl methacrylate (48.8 g), allyl methacrylate (2.4 g), phosphoethyl methacrylate (12.8 g, 60% active), and methacrylic acid (3.2 g).

To a 5-liter, four-necked round-bottom flask equipped with a paddle stirrer, a thermometer, $N_2$ inlet, and a reflux condenser was added DI water (915 g) and Disponil FES 32 anionic surfactant (10.8 g, 30% active). The contents of the flask were heated to 85° C. under a $N_2$ atmosphere and stirring was initiated. A portion of the first monomer emulsion (104 g) was then added, quickly followed by addition of an aqueous solution of sodium persulfate (2.4 g in 30 g DI water) and a rinse of deionized water (5 g). After stirring for 10 min, the remainder of the first monomer emulsion was added linearly over 8 to 10 min, followed by a DI water rinse (25 g). After completion of addition of the first monomer emulsion feed, the contents of the flask were held at 85° C. for 10 min before continuing with Stage II.

B. Stage II

A second monomer emulsion was prepared by mixing DI water (365 g), sodium dodecylbenzene sulfonate (66 g, 23% active), butyl acrylate (856.88 g), styrene (545.7 g), acrylic acid (28.8 g), sodium 4-vinylbenzenesulfonate (4.8 g, 90% active), and vinyltrimethoxysilane (4.3 g). The second monomer emulsion and an aqueous oxidant solution containing sodium persulfate (2.4 g) and sodium hydroxide (4 g, 50% active) in DI water (57 g) were added linearly and separately to the flask over a period of 120 min. The contents of the flask were maintained at 85° C. during the addition of the second monomer emulsion. When all additions were complete, the vessel containing the second monomer emulsion was rinsed with deionized water (25 g), which was then added to the flask.

The contents of the flask were cooled to 80° C. and a first catalyst/activator pair were added to the flask to reduce residual monomer. A second catalyst/activator pair were added to the flask at 65° C. The polymer was then neutralized to pH 8 with a dilute sodium hydroxide solution. The measured particle size was 90-110 nm and the measured solids were 45-46%.

Comparative Example 2

Preparation of Styrene-Acrylic Acorns by Thermal Shot Polymerization

A. Stage I

A first monomer mixture was prepared by mixing deionized water (DI water, 55 g), butyl acrylate (92.8 g), methyl methacrylate (48.8 g), allyl methacrylate (2.4 g), phosphoethyl methacrylate (12.8 g, 60% active) and methacrylic acid (3.2 g).

To a 5-liter, four-necked round-bottom flask equipped with a paddle stirrer, a thermometer, $N_2$ inlet, and a reflux condenser was added DI water (915 g) and Disponil FES 32 anionic surfactant (26.8 g, 30% active). The contents of the flask were heated under a $N_2$ atmosphere and stirring was initiated. Once the reactor reached 77° C., the first monomer mixture (215 g) was added, quickly followed by an aqueous solution of sodium persulfate (6.4 g in 20 g DI water) and a further rinse with DI water (5 g). The contents of the flask were allowed to exotherm and then held for 15 min before continuing with Stage II, which was carried out substantially as shown in Comparative Example 1 B.

Comparative Example 3

Preparation of Styrene-Acrylic Acorns by Redox Shot Polymerization

A first monomer mixture was prepared by mixing DI water (55 g), butyl acrylate (92.8 g), methyl methacrylate (48.8 g), allyl methacrylate (2.4 g), phosphoethyl methacrylate (60% active, 12.8 g), and methacrylic acid (3.2 g).

To a 5-liter, four-necked round-bottom flask equipped with a paddle stirrer, a thermometer, $N_2$ inlet, and a reflux condenser was added DI water (915 g) and Disponil FES 32 anionic surfactant (26.8 g, 30% active). The contents of the flask were heated to 77° C. under a $N_2$ atmosphere and stirring was initiated. Once the reactor reached 77° C., a redox promoter solution was added to the kettle. The entire first monomer mixture (215 g) was then added, quickly followed by a solution of sodium persulfate (2.2 g) dissolved in DI water (20 g), a solution of 2.4 g sodium bisulfate (2.4 g) dissolved in DI water (20 g), and a rinse of of DI water (5 g) for each addition. The contents of the flask were held for 15 min.

A second monomer emulsion was prepared by mixing DI water (365 g), dodecylbenzene sulfonate (23% active, 66 g) butyl acrylate (856.88 g), styrene (545.7 g), acrylic acid (28.8 g), sodium 4-vinylbenzenesulfonate (90% active, 4.8 g), and vinyltrimethoxysilane (4.3 g).

The second monomer emulsion, an oxidant solution containing sodium persulfate (2.1 g) dissolved in of DI water (60 g), and a reductant solution containing sodium bisulfate (2.3 g) and NaOH (50% active, 4 g) dissolved in DI water (57 g) were added linearly and separately to the flask over a period of 120 min. The contents of the flask were maintained at a temperature of 85° C. during the addition of the second monomer emulsion. When all additions were complete, the container containing the second monomer emulsion was rinsed with DI water (25 g), which was then added to the flask.

The contents of the flask were cooled to 80° C. and a first catalyst/activator pair was added to the flask to reduce residual monomer. A second catalyst/activator pair was added to the flask at 65° C. The polymer was then neutralized to pH 8 with a dilute NaOH solution. The measured particle size was 90-120 nm and the measured solids were typically 45-47%.

Example 1

Preparation of Styrene-Acrylic Acorns by a Pre-Form Process

A. Pre-Form Synthesis

A first monomer emulsion was prepared by mixing (DI water) 200 g, Disponil FES 993 (64 g, 30% active), butyl acrylate (371.2 g), methyl methacrylate (195.2 g), allyl methacrylate (9.6 g), phosphoethyl methacrylate (51.2 g, 60% active), and methacrylic acid (12.8 g).

To a 5-liter, four-necked round-bottom flask equipped with a paddle stirrer, a thermometer, $N_2$ inlet, and a reflux condenser was added DI water (600 g) and Disponil FES 993 anionic surfactant (21.3 g, 30% active). The contents of the flask were heated to 85° C. under a $N_2$ atmosphere, and stirring was initiated. A portion of the first monomer emulsion (70 g) was then added, quickly followed by addition of an aqueous solution of sodium persulfate (2.56 g in 30 g DI water) and a further rinse with deionized water (5 g). After stirring for 10 min, the remainder of the first monomer emulsion, followed by a DI rinse (25 g), and an aqueous initiator solution of sodium persulfate (0.64 g dissolved in 50 g DI water) were added linearly and separately over 40 min. After completion of addition of the monomer emulsion feed, the contents of the flask were held at 85° C. for 10 min. After 10 min the cofeed was finished, and the contents of the flask were held at 85° C. for an additional 10 minutes. The contents of the flask were cooled to room temperature. The measured particle size was 60-75 nm by dynamic light scattering and the solids were 40-41%.

B. Pre-Form Process Polymerization

To a 5-liter, four-necked round-bottom flask equipped with a paddle stirrer, a thermometer, $N_2$ inlet, and a reflux condenser was added DI water (800 g). The contents of the flask were heated to 85° C. under a $N_2$ atmosphere and stifling was initiated. An aqueous solution of ammonium persulfate (4.8 g in 20 g DI water), followed by a rinse of DI water (5 g) was added to the kettle. An amount of the pre-form equal to 10% of the total final polymer (~400 g) was added to the kettle. Once the kettle temperature had returned to >80° C., the Stage II feeds were initiated.

A second monomer emulsion was prepared by mixing DI water (365 g), sodium dodecylbenzene sulfonate (66 g, 23% active), butyl acrylate (856.88 g), styrene (545.7 g), acrylic acid (28.8 g), sodium 4-vinylbenzenesulfonate (4.8 g, 90% active), and vinyltrimethoxysilane (4.3 g). The second monomer emulsion and an oxidant solution containing sodium persulfate (2.4 g) and sodium hydroxide (4 g, 50% active) dissolved in DI water (57 g) were added linearly and separately to the flask over a period of 120 min. The contents of the flask were maintained at 85° C. during the addition of the second monomer emulsion. When all additions were complete, the vessel containing the second monomer emulsion was rinsed with DI water (25 g), which was then added to the flask.

The contents of the flask were cooled to 80° C. and a first catalyst/activator pair were added to the flask to reduce residual monomer. A second catalyst/activator pair were added to the flask at 65° C. The polymer was then neutralized to pH 8 with a dilute sodium hydroxide solution. The measured particle size was 120-140 nm by dynamic light scattering and the measured solids were 45-46%.

To estimate the general TiO$_2$ compatibility with polymeric dispersions prepared by the different processes, mixtures were formed by diluting Kronos 4311 TiO$_2$ slurry with DI water and adding the Example 1 and Comparative Example 1-3 binders and ammonia to the mixtures with constant stirring, and then stirring for an additional 10 min. Typically, extenders and other paint ingredients are be added to this mixture to complete the paint-making process. Therefore, good compatibility of the binder-TiO$_2$ slurry is crucial for making good quality paints.

For the above mixture, the volume of solids (VS) was maintained at 40% and pigment volume concentration (PVC) was maintained at 31%. An example of the order of addition and approximate amounts used to prepare the mixtures is shown in Table 1. Films of the mixtures were prepared on a black release chart (Leneta Form RC-BC) after 1 h using a 1.5-mil Bird blade. The compatibility of the binder with TiO$_2$ (as measured by the degree of grit formation) is shown in Table 2. Dry films were visually inspected for grit, and rated as GOOD (no or negligible amount of grits), BAD (high density of grits), and V. BAD (very high density of grits).

TABLE 1

An example of the formulation used to test TiO$_2$ compatibility.

| INGREDIENTS | WEIGHT (%) |
| --- | --- |
| Kronos 4311 | 46 |
| Water | 6 |
| Experimental Binder | 47 |
| Ammonia (28%) | 0.3 |
| TOTAL | 100 |

TABLE 2

Summary of TiO$_2$ Compatibility of Binders

| | Example 1 (Pre-formed) | Comp. Ex. 3 (Redox shot) | Comp. Ex. 2 (Thermal shot) | Comp. Ex. 1 (Thermal seeded) |
| --- | --- | --- | --- | --- |
| TiO$_2$ Compatibility: | GOOD | V. BAD | BAD | V. BAD |
| % PEM INCORPORATION | | | | |
| Binder First Stage | 90 | 63 | 80 | 81 |
| Binder Second Stage | 8 | 29 | 16 | 9 |
| Serum Phase | 1 | 8 | 4 | 10 |

As seen in Table 2, the binder prepared by the process of Example 1 was the only sample that resulted in grit-free films and, therefore, the only sample that could be used to make paints with acceptable properties. Conversely, paints made using the binder-TiO$_2$ mixtures prepared from the processes of the comparative examples would result in overall inferior paint properties including grit and loss of hiding and gloss in paint films, as well as sedimentation in the can.

Though not bound by theory, it is believed that excessive grit formation occurs when a significant amount of phosphoethyl methacrylate (PEM) is incorporated into the second phase of the polymer particles, thereby increasing the probability of the more uniformly adsorbing particles associating with multiple TiO$_2$ particles. Similarly, it is believed that excessive amounts of oligomeric PEM in the aqueous phase increase the probability of TiO$_2$ particles adhering to each other.

The theory is supported by the $^{31}$P NMR spectroscopic analyses of the binders. The spectra show, on the one hand, both negligible PEM incorporated in the second phase, as well as negligible oligomeric PEM in the serum phase for the binder prepared by Example 1, and, on the other hand, high levels of PEM incorporated in the second phase, or oligomeric PEM present in higher concentration in the aqueous phase, or both. The low levels of grit exhibited for the binder prepared by Example 1 and the high density of grit for binders prepared by the comparative examples are consistent with this data.

The invention claimed is:

1. A process comprising contacting, in a distinct step, a stable aqueous dispersion of pre-formed polymer particles with a monomer emulsion under emulsion polymerization conditions to form a stable aqueous dispersion of pre-formed polymer particles protuberating from polymer particles arising from the polymerization of the monomer emulsion, wherein the pre-formed polymer particles comprise, based on the weight of the pre-formed polymer particles:
   a) 2 to 10 weight percent structural units of a phosphorus acid monomer or a salt thereof;
   b) from 0.2 to 20 weight percent structural units of a carboxylic acid monomer or a sulfur acid monomer or a salt thereof or a combination thereof; and
   c) from 0.1 to 30 weight percent structural units of a multiethylenically unsaturated monomer; and
   d) from 5 to 60 weight percent structural units of methyl methacrylate or styrene or a combination thereof and from 35 to 90 weight percent structural units of ethyl acrylate, butyl acrylate, 2-propylheptyl acrylate, or 2-ethylhexyl acrylate or a combination thereof, based on the weight of the pre-formed polymer particles; and
wherein the monomer emulsion comprises:
   a) less than 10 percent by weight of a phosphorus acid monomer and salts thereof, based on the weight percent of the structural units of phosphorus acid monomer or a salt thereof in the pre-formed polymer particles;
   b) from 0.1 to 4 weight percent of a carboxylic acid monomer or sulfur acid monomer or a salt thereof or combination thereof, based on total monomers in the monomer emulsion;
   c) less than 0.5 weight percent of a multiethylenically unsaturated monomer, based on total monomers in the monomer emulsion; and
   d) comprising methyl methacrylate or styrene or a combination thereof; and ethyl acrylate, butyl acrylate, or ethylhexyl acrylate, or a combination thereof; and
wherein the weight-to-weight ratio of the monomers in the monomer emulsion to the pre-formed polymer particles is in the range of from 3:1 to 15:1; and wherein
the solids content of the pre-formed polymer particles is in the range of from 30 to 50 weight percent, based on the weight of the stable aqueous dispersion of the pre-formed polymer particles; whereby the stable aqueous dispersion of the preformed polymer particles is prepared in a separate vessel prior to being contacted with the monomer emulsion.

2. The process of claim 1 wherein the ethylenically unsaturated bulk monomers in the monomer emulsion comprise methyl methacrylate or styrene or a combination thereof at a concentration in the range of 25 to 45 weight percent; and butyl acrylate at a concentration in the range of 40 to 70 weight percent or ethylhexyl acrylate at a concentration in the range of from 30 to 65 weight percent, based on the weight of total monomers in the monomer emulsion.

3. The process of claim 1 wherein
   a) the structural units of polymerizable ethylenically unsaturated bulk monomers in the pre-formed polymer particles comprise from 20 to 40 weight percent structural units of methyl methacrylate and from 50 to 70 weight percent structural units of butyl acrylate, based on the weight of the pre-formed polymer particles;
   b) the pre-formed polymer particles comprise from 3 to 8 weight percent structural units of the phosphorus acid monomer or a salt thereof, based on the weight of the pre-formed polymer particles, wherein the phosphorus acid monomer is phosphoethyl methacrylate or a salt thereof;
   c) the pre-formed polymer particles comprise from 0.2 to 10 weight structural units of the multiethylenically unsaturated monomer, based on the weight of the pre-formed polymer particles, wherein the multiethylenically unsaturated monomer is allyl methacrylate;
   d) the pre-formed polymer particles comprise from 0.5 to 5 weight structural units of a carboxylic acid monomer or a salt thereof, based on the weight of the pre-formed polymer particles; wherein the carboxylic acid monomer is methacrylic acid;
   wherein the pre-formed particles have a volume average diameter in the range of from 50 to 90 nm.

4. The process of claim 3 wherein:
   a) the concentration of the phosphorus acid monomer or a salt thereof in the monomer emulsion is less than 1 weight percent, based on the weight percent of structural units of phosphorus acid monomers or a salt thereof in the pre-formed polymer particles;
   b) the total concentration of the carboxylic acid or sulfur acid monomer or a salt thereof or a combination thereof in the monomer emulsion is from 1 to 4 weight percent, based on the weight of monomers in the monomer emulsion, wherein the carboxylic acid or sulfur acid monomer is acrylic acid, methacrylic acid, or styrene sulfonic acid or a combination thereof;
   c) the concentration of the multiethylenically unsaturated monomer in the monomer emulsion is 0; and
   d) the ethylenically unsaturated bulk monomers in the monomer emulsion comprise styrene or methyl methacrylate or a combination thereof at a concentration of from 32 weight percent to 45 weight percent; and butyl acrylate at a concentration in the range of from 45 weight percent to 65 weight percent, based on the weight of monomers in the monomer emulsion.

5. The process of claim 4 wherein concentration of phosphorus acid monomer in the monomer emulsion is 0.

* * * * *